Dec. 14, 1926.

Re. 16,504

H. SALMON ET AL.

MACHINE FOR EXPANDING SHEET METAL

Original Filed August 27, 1920 4 Sheets-Sheet 1

Inventors
H. Salmon and
H. Booton
by their Attorneys
Baldwin & Wright

Dec. 14, 1926. Re. 16,504

H. SALMON ET AL

MACHINE FOR EXPANDING SHEET METAL

Original Filed August 27, 1920 4 Sheets-Sheet 2

Inventors
H. Salmon and
H. Booton
by their Attorneys
Baldwin & Wight

Dec. 14, 1926. Re. 16,504

H. SALMON ET AL

MACHINE FOR EXPANDING SHEET METAL

Original Filed August 27, 1920 4 Sheets-Sheet 3

Inventors
H. Salmon and
H. Booton
by their Attorneys
Bradford Wright

Dec. 14, 1926. Re. 16,504
H. SALMON ET AL
MACHINE FOR EXPANDING SHEET METAL
Original Filed August 27, 1920 4 Sheets-Sheet 4
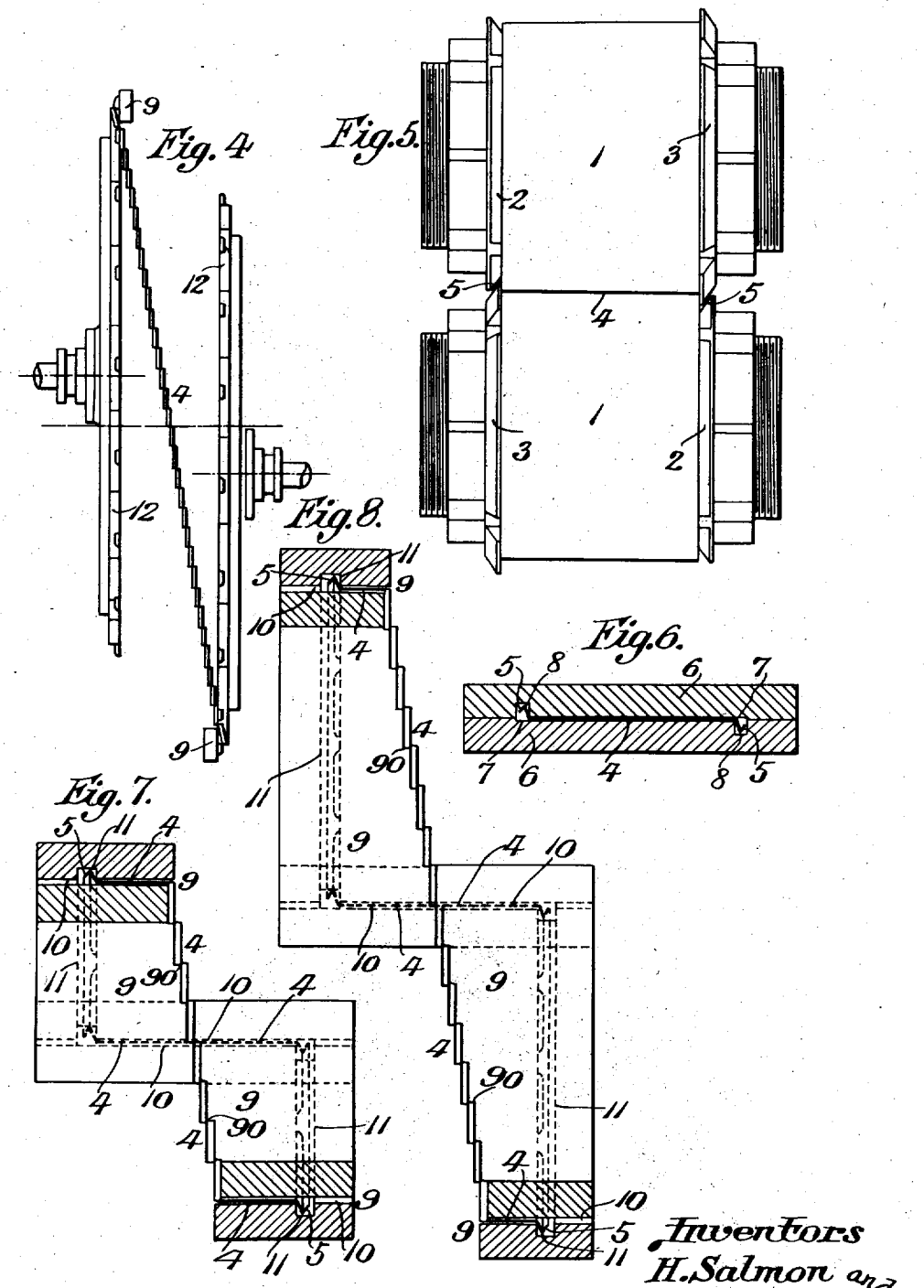
Inventors
H. Salmon and
H. Booton
by their Attorneys
Baldwin & Wright Reissued Dec. 14, 1926.

Re. 16,504

UNITED STATES PATENT OFFICE.

HARRY SALMON AND HARRY BOOTON, OF WESTMINSTER, LONDON, ENGLAND, ASSIGNORS TO THE EXPANDED METAL COMPANY, LIMITED, OF WESTMINSTER, LONDON, ENGLAND.

MACHINE FOR EXPANDING SHEET METAL.

Original No. 1,408,647, dated March 7, 1922, Serial No. 406,424, filed August 27, 1920, and in Great Britain September 10, 1919. Application for reissue filed October 12 1923. Serial No. 668,248.

It has before been proposed to expand a slitted metal sheet by means of a machine having two divergent series of pairs of rollers or two diverging pairs of chains which grip the edges or selvages of the sheet and feed them through the machine whilst compelling them to travel along divergent paths so that the sheet is expanded.

We have found that it is unnecessary to employ for gripping the selvages of the sheet feeding or travelling means, such as rollers or chains.

According to this invention we employ a pair of fixed divergent guides or expander jaws, each of which has throughout its length a slot along which the selvages of the sheet can travel and which is provided with a shoulder behind which the up-turned selvage or extreme strand of the sheet engages so that the selvage cannot be pulled out of the slot, but must follow the slot to the end of the guide. In some cases the sheet proceeds through the machine, as it leaves the slitting rollers and the rollers which displace the selvages out of the plane of the rest of the sheet, without any further assistance, but in other cases we may provide at the further ends of the divergent guides or expander jaws a pair of pin wheels to engage the selvages of the expanded sheet and to draw it through the machine. The divergent guides may be either straight or stepped in such a way that the central portion of the sheet is expanded first and that subsequently portions on each side of the centre are released from the guides and expanded successively.

In the accompanying drawings which illustrate the invention:—

Figure 4 is a detail end view showing a sheet fully expanded, and pin wheels, and Figure 5 is a detail end view of the rolls for deforming the selvage.

Figure 1:
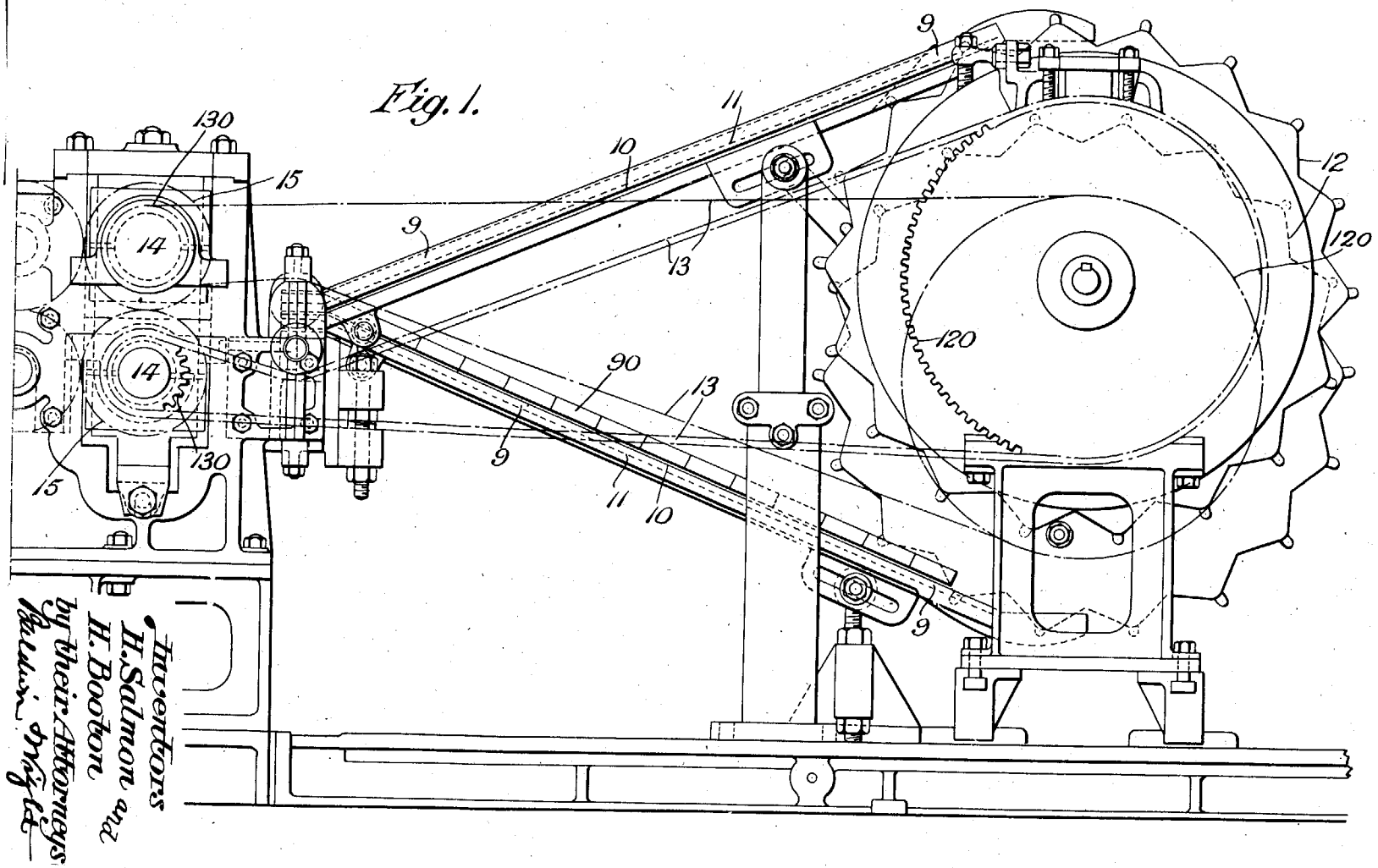
Figure 1 is a side elevation.
Figure 2:
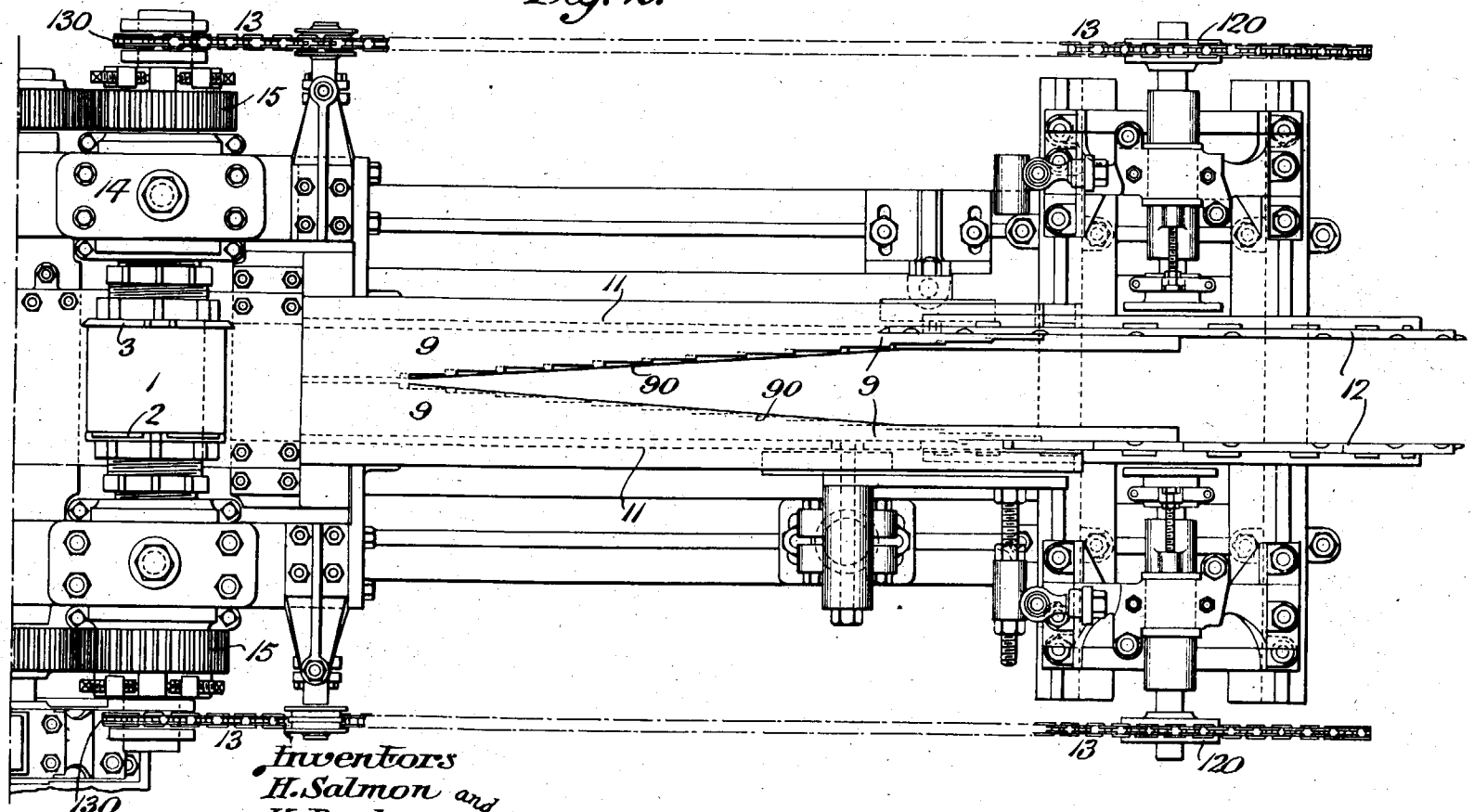
Figure 2 is a plan thereof.
Figure 3:
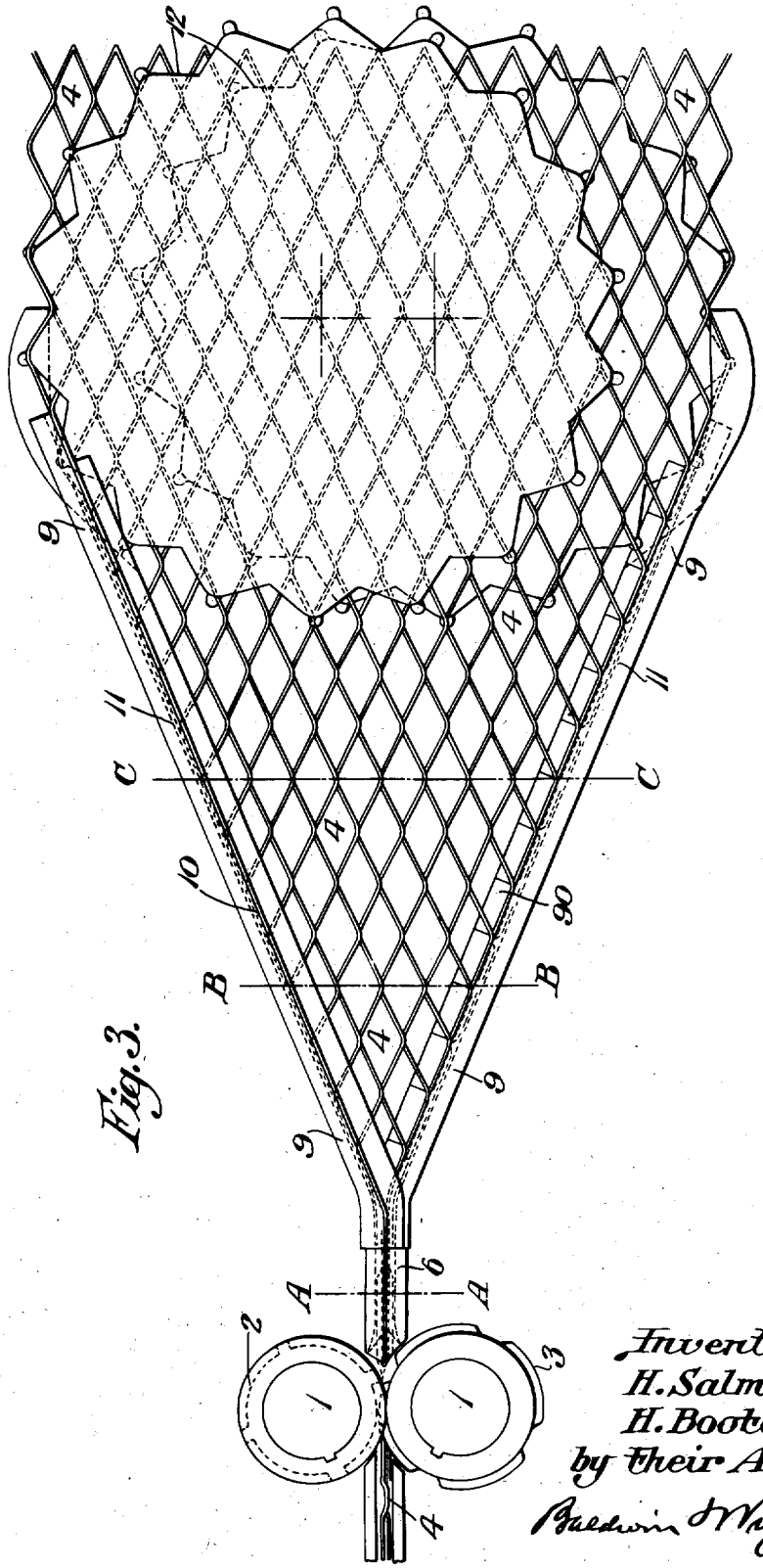
Figure 3 is a side view showing the selvage deforming rolls, guides and expanded sheet.

Figures 6, 7, and 8 are sections on the lines A—A, B—B, C—C, respectively, of Figure 3, Figures 5, 6, 7, and 8 all being to a larger scale.

1 are selvage deforming rolls in bearings 14 and driven through spur wheels 15. Each roll has at one end an inwardly bevelled segmental flange 2 and at the other end a segmental flange 3 bevelled outwardly at the same angle as the flange 2, the flanges 2 and 3 of one roll being adapted to co-operate with the flanges 3 and 2 of the other roll.

When a metal sheet 4 which has previously been slitted in any suitable manner so as to form parallel strips connected by junctions of uncut metal is passed through the rolls 1, the selvages 5 are bent at intervals at right angles to the plane of the sheet and are then also doubled or bent back in the opposite direction as is clearly shown in Figures 5 to 8.

After passing through the selvage deforming rolls 1, the sheet 4 enters a guide 6 having in it a slot 7 extending the width of the sheet 4, and a groove 8 at each end of the slot 7 along which the selvages 5 can travel.

On leaving the guide 6 the sheet 4 enters a pair of fixed divergent guides or expander jaws 9 each of which is formed of a top and bottom plate arranged a suitable distance apart to form a slot 10 extending throughout its length along which the selvage 5 and part of the sheet 4 can travel; formed in the outer plate of each guide 9 is a groove 11 the inner face of which forms a shoulder behind which the upturned selvage 5 of the sheet 4 engages so that the selvage cannot be pulled out of the slot 10 but must follow the slot 10 to the end of the guide 9.

The guides or expander jaws 9 as shown in the drawings are tapered and have steps 90 along their inner edges and are at their wider ends adjacent to the selvage rolls 1 of such width that practically the whole of the sheet 4 is covered up or enclosed by the walls of the slots 10 so that only the central portion of the sheet 4 is expanded, portions on each side of the centre of the sheet being subsequently released from the slots 10 in the guides 9 and expanded successively until at the end of the guides the whole of the sheet 4 between the selvages 5 has been expanded, see Figures 3, 4, 7, and 8.

At the end of the guides or expander jaws 9 but entirely independent thereof is arranged a pair of pin wheels 12 having chain wheels 120 driven by chains 13 actuated by chain wheels 130 on the same axes as the selvage rolls 1. The pin wheels 12 engage the selvages of the expanded sheet 4 and draw it through the guides.

It will be observed that the fixed divergent guides or jaws are continuous or unbroken and that they are provided with means which engage bent or deformed edge portions or selvages previously specially formed in the previously slitted sheet, in such manner as to prevent the sheet from being displaced laterally while being expanded. By locating the sheet feeding means beyond one end of the guides or jaws a very simple and efficient construction is provided, inasmuch as the guides are not complicated by being themselves equipped with feed rolls or the like.

Though we prefer to use pin wheels 12 to draw off the sheet 4, these are not necessary.

What we claim is:—

1. In machines for expanding sheet metal, a pair of fixed divergent guides having means adapted to engage each selvage of the sheet and enclose portions of the sheet in such a manner that only that part of the sheet which is not enclosed can expand, and means independent of the guides for forcing the sheet through the guides.

2. In machines for expanding sheet metal, a pair of fixed divergent and tapered guides having means adapted to engage each selvage of the sheet and enclose portions of the sheet in such a manner that only that part of the sheet which is not enclosed can expand, and means independent of the guides for forcing the sheet through the guides.

3. In machines for expanding sheet metal, a pair of fixed stepped divergent and tapered guides having means adapted to engage each selvage of the sheet and enclose portions of the sheet in such a manner that only that part of the sheet which is not enclosed can expand, and means independent of the guides for forcing the sheet through the guides.

4. In machines for expanding sheet metal a pair of divergent guides adapted to engage each selvage of the sheet and enclose portions of the sheet in such a manner that only that part of the sheet which is not enclosed can expand, and rolls adapted to deform the selvages and force the sheet through the guides.

5. In machines for expanding sheet metal, a pair of divergent and tapered guides adapted to engage each selvage of the sheet and enclose portions of the sheet in such a manner that only that part of the sheet which is not enclosed can expand, and rolls adapted to deform the selvages and force the sheet through the guides.

6. In machines for expanding sheet metal, a pair of stepped divergent and tapered guides adapted to engage each selvage of the sheet and enclose portions of the sheet in such a manner that only that part of the sheet which is not enclosed can expand, and rolls adapted to deform the selvages and force the sheet through the guides.

7. In machines for expanding sheet metal, a pair of divergent guides having grooves adapted to engage each selvage of the sheet and enclose portions of the sheet in such a manner that only that part of the sheet which is not enclosed can expand, and means independent of the guides for forcing the sheet through the guides.

8. In machines for expanding sheet metal, a pair of divergent and tapered guides having grooves adapted to engage each selvage of the sheet and enclose portions of the sheet in such a manner that only that part of the sheet which is not enclosed can expand, and means independent of the guides for forcing the sheet through the guides.

9. In machines for expanding sheet metal, a pair of divergent guides having grooves adapted to engage each selvage of the sheet and enclose portions of the sheet in such a manner that only that part of the sheet which is not enclosed can expand, and rolls adapted to deform the selvages and force the sheet through the guides.

10. In machines for expanding sheet metal, a pair of divergent and tapered guides having grooves adapted to engage each selvage of the sheet and enclose portions of the sheet in such a manner that only that part of the sheet which is not enclosed can expand, and rolls adapted to deform the selvages and force the sheet through the guides.

11. In machines for expanding sheet metal, rolls adapted to deform the selvages of the sheet, a guide having a slot extending the width of the sheet, and having grooves adapted to receive the selvages, and a pair of divergent and tapered guides having grooves adapted to receive the selvages.

12. In machines for expanding sheet metal, rolls adapted to deform the selvages of the sheet, a guide having a slot extending the width of the sheet and having grooves adapted to receive the selvages, and a pair of stepped divergent and tapered guides having grooves adapted to receive the selvages.

13. In machines for expanding sheet metal, a pair of divergent guides having means adapted to engage each selvage of the sheet and enclose portions of the sheet in such a manner that only that part of the sheet which is not enclosed can expand, means independent of the guides for forcing the sheet through the guides, and pin wheels adapted to engage the selvages of the expanded sheet.

14. In machines for expanding sheet metal, a pair of divergent and tapered guides having means adapted to engage each selvage of the sheet and enclose portions of the sheet in such a manner that only that part of the sheet which is not enclosed can expand, means independent of the guides for forcing the sheet through the guides, and pin wheels adapted to engage the selvages of the expanded sheet.

15. In machines for expanding sheet metal, a pair of stepped divergent and tapered guides having means adapted to engage each selvage of the sheet and enclose portions of the sheet in such a manner that only that part of the sheet which is not enclosed can expand, means independent of the guides for forcing the sheet through the guides, and pin wheels adapted to engage the selvages of the expanded sheet.

16. In machines for expanding sheet metal, a pair of divergent guides adapted to engage each selvage of the sheet and enclose portions of the sheet in such a manner that only that part of the sheet which is not enclosed can expand, rolls adapted to deform the selvages and force the sheet through the guides, and pin wheels adapted to engage the selvages of the expanded sheet.

17. In machines for expanding sheet metal, a pair of divergent and tapered guides adapted to engage each selvage of the sheet and enclose portions of the sheet in such a manner that only that part of the sheet which is not enclosed can expand, rolls adapted to deform the selvages and force the sheet through the guides, and pin wheels adapted to engage the selvages of the expanded sheet.

18. In machines for expanding sheet metal, a pair of stepped divergent and tapered guides adapted to engage each selvage of the sheet and enclose portions of the sheet in such a manner that only that part of the sheet which is not enclosed can expand, rolls adapted to deform the selvages and force the sheet through the guides, and pin wheels adapted to engage the selvages of the expanded sheet.

19. In machines for expanding sheet metal, a pair of divergent guides having grooves adapted to engage each selvage of the sheet and enclose portions of the sheet in such a manner that only that part of the sheet which is not enclosed can expand, means independent of the guides for forcing the sheet through the guides, and pin wheels adapted to engage the selvages of the expanded sheet.

20. In machines for expanding sheet metal, a pair of divergent and tapered guides having grooves adapted to engage each selvage of the sheet and enclose portions of the sheet in such a manner that only that part of the sheet which is not enclosed can expand, means independent of the guides for forcing the sheet through the guides, and pin wheels adapted to engage the selvages of the expanded sheet.

21. In machines for expanding sheet metal, a pair of divergent guides having grooves adapted to engage each selvage of the sheet and enclose portions of the sheet in such a manner that only that part of the sheet which is not enclosed can expand, rolls adapted to deform the selvages and force the sheet through the guides and pin wheels adapted to engage the selvages of the expanded sheet.

22. In machines for expanding sheet metal, a pair of divergent and tapered guides having grooves adapted to engage each selvage of the sheet and enclose portions of the sheet in such a manner that only that part of the sheet which is not enclosed can expand, rolls adapted to deform the selvages and force the sheet through the guides, and pin wheels adapted to engage the selvages of the expanded sheet.

23. In machines for expanding sheet metal, rolls adapted to deform the selvages of the sheet, a guide having a slot extending the width of the sheet and having grooves adapted to receive the selvages, a pair of divergent and tapered guides having grooves adapted to receive the selvages, and pin wheels adapted to engage the selvages of the expanded sheet.

24. In machines for expanding sheet metal, rolls adapted to deform the selvages of the sheet, a guide having a slot extending the width of the sheet, and having grooves adapted to receive the selvages, a pair of stepped divergent and tapered guides having grooves adapted to receive the selvages, and pin wheels adapted to engage the selvages of the expanded sheet.

25. A metal expanding machine including a pair of divergent expander jaws adapted to receive a previously slitted grooved blank, guiding means carried by the jaws for said blank and non-cutting feeding elements for advancing the blank over the guides.

26. In a machine for expanding sheet metal, a pair of divergent expander jaws, guides at the edges of the jaws having an interlocking engagement with the edge portions only of the sheet and continuous feeding means for advancing the sheet over the guides.

27. In a machine for expanding sheet metal, a pair of divergent expander jaws adapted to receive a previously slitted sheet, stationary sheet guiding and holding means at the edges of the jaws and feeding means entirely independent of and removed from the jaws for advancing the sheet over the guide and holding means.

28. In a machine for expanding sheet metal, a pair of divergent expander jaws adapted to receive a previously slitted sheet, guiding means carried by the jaws for said sheet and non-cutting feeding elements independent of the jaws and removed therefrom for advancing the blank over the guides.

29. In a machine for expanding sheet metal, a pair of divergent expander jaws, stationary guides at the edges of the jaws having interlocking engagement with the deformed edges of a previously slitted sheet and feeding means located beyond one end of the guides for advancing the sheet over the guides.

30. In a machine for expanding sheet metal, a pair of divergent expander jaws having means to engage each selvage of the sheet and enclose portions of the sheet in such a manner that only that part of the sheet which is not enclosed can expand, and feeding means located beyond one end of the jaws for advancing the sheet therethrough.

31. In a machine for expanding sheet metal, upper and lower divergent continuous guide members having means to engage each selvage of a previously slitted sheet to prevent lateral displacement thereof while being expanded and means independent of said members for advancing the sheet therethrough.

32. In a machine for expanding sheet metal, means for deforming the edges of the metal sheet, a pair of divergent guides having means to receive the deformed edges and means independent of the guides for advancing the sheet therethrough.

33. In a machine for expanding sheet metal, means for deforming the longitudinal edges of the sheet, a pair of divergent guides having means to interlock with the deformed edges and means independent of the guides for advancing the sheet therethrough.

34. In a machine for expanding sheet metal, means for deforming the edges of a slitted sheet, a pair of fixed divergent guides having means to interlock with the deformed edges of the sheet and means located beyond one end of the guides for advancing the sheet therethrough.

HARRY SALMON.
HARRY BOOTON.